Aug. 4, 1942.   H. J. TALBOT ET AL   2,291,772
COMBINED FLOCCULATION AND SEDIMENTATION APPARATUS
Filed Jan. 24, 1940   4 Sheets-Sheet 1

INVENTORS
HENRY J. TALBOT,
FRANZ C.W.A.H. POEPEL,
BY Arthur
Middleton
ATTORNEY.

Aug. 4, 1942.  H. J. TALBOT ET AL  2,291,772
COMBINED FLOCCULATION AND SEDIMENTATION APPARATUS
Filed Jan. 24, 1940  4 Sheets-Sheet 2

INVENTORS
HENRY J. TALBOT.
FRANZ C.W.A.H. POEPEL,
BY
ATTORNEY.

Aug. 4, 1942.   H. J. TALBOT ET AL   2,291,772
COMBINED FLOCCULATION AND SEDIMENTATION APPARATUS
Filed Jan. 24, 1940   4 Sheets-Sheet 3

INVENTORS
HENRY J. TALBOT,
FRANZ C. W. A. H. POEPEL,
BY Arthur Middleton
ATTORNEY.

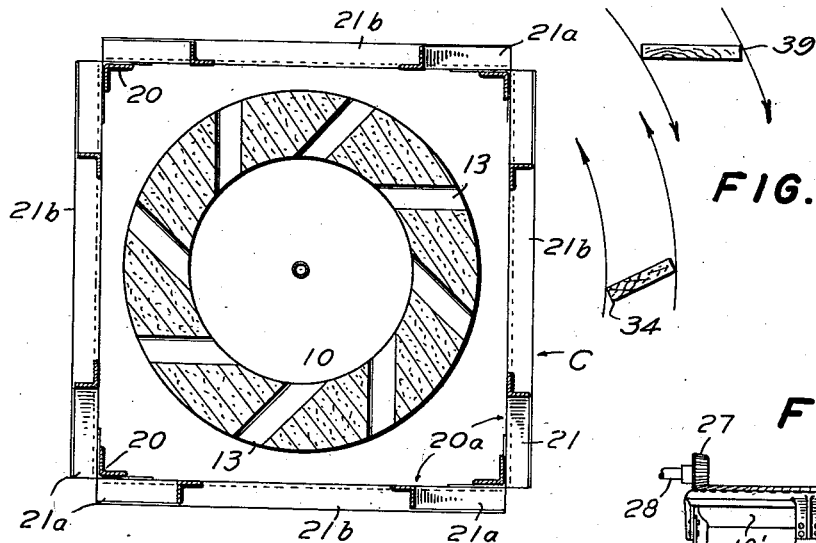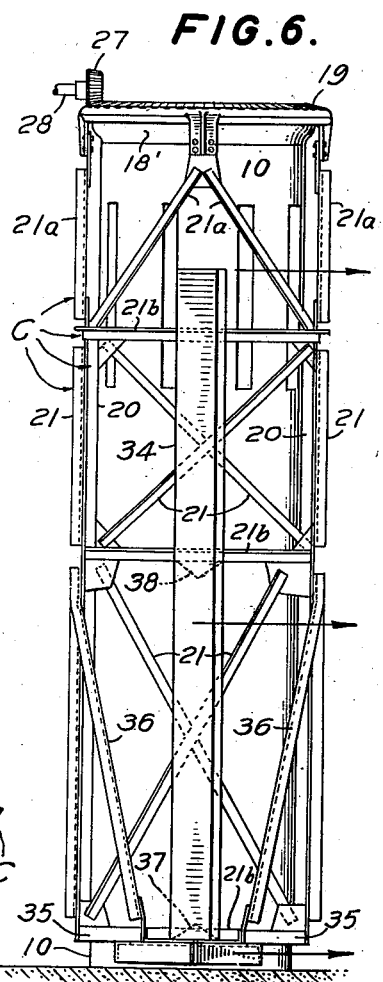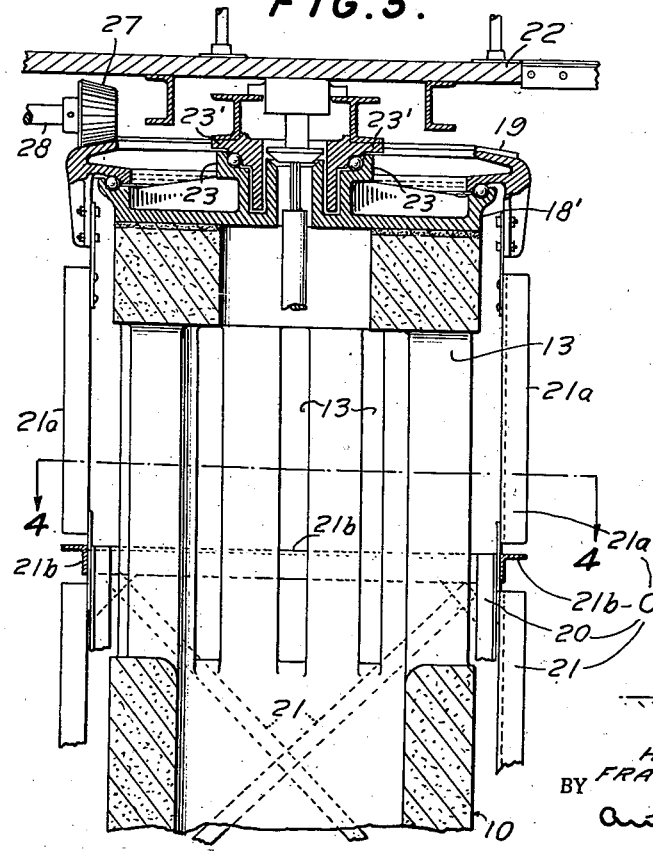

Patented Aug. 4, 1942

2,291,772

UNITED STATES PATENT OFFICE 2,291,772

COMBINED FLOCCULATION AND SEDIMENTATION APPARATUS

Henry John Talbot, London, England, and Franz Carl Wilhelm Anton Henri Pöpel, The Hague, Netherlands, assignors to The Dorr Company Inc., New York, N. Y., a corporation of Delaware Application January 24, 1940, Serial No. 315,302
In Great Britain August 11, 1939

17 Claims. (Cl. 210—12)

This invention relates to combined flocculation and sedimentation apparatus for effecting the separation of solids from liquids and particularly for the treatment of suspensions of very fine particles which require to be subjected to the step of flocculation before they can be readily separated by sedimentation. One of the uses to which such apparatus may be put is the treatment of sewage and the like, and an example of an apparatus of the general type to which the invention relates is shown in British patent specification No. 490,112 and also in the U. S. patent to Darby Re. 20,971.

It is one of the objects of the invention to provide an improved arrangement or construction of apparatus of this type whereby the successive steps of flocculation and sedimentation are more effectively and satisfactorily performed. Another object is to provide a better form of tank structure for the purpose in view and one that is economical to build and maintain. Another object is to provide an arrangement affording better conditions for flocculation and for the transfer of the flocs from the flocculation zone to the sedimentation zone. Another object is to provide improved driving arrangements for the flocculating and clarifying mechanism and particularly to provide a simple mode of drive which affords individual control of the two mechanisms and also permits the operation of one or other of these mechanisms alone if desired. Another object is to provide an arrangement which enables the flocculating mechanism to be put out of action and the whole of the tank space to be used for sedimentation. Other objects and advantages will be clear to those conversant with the art from a consideration of the following disclosure.

In the accompanying drawings which illustrate one preferred construction embodying the invention:

Figure 1:
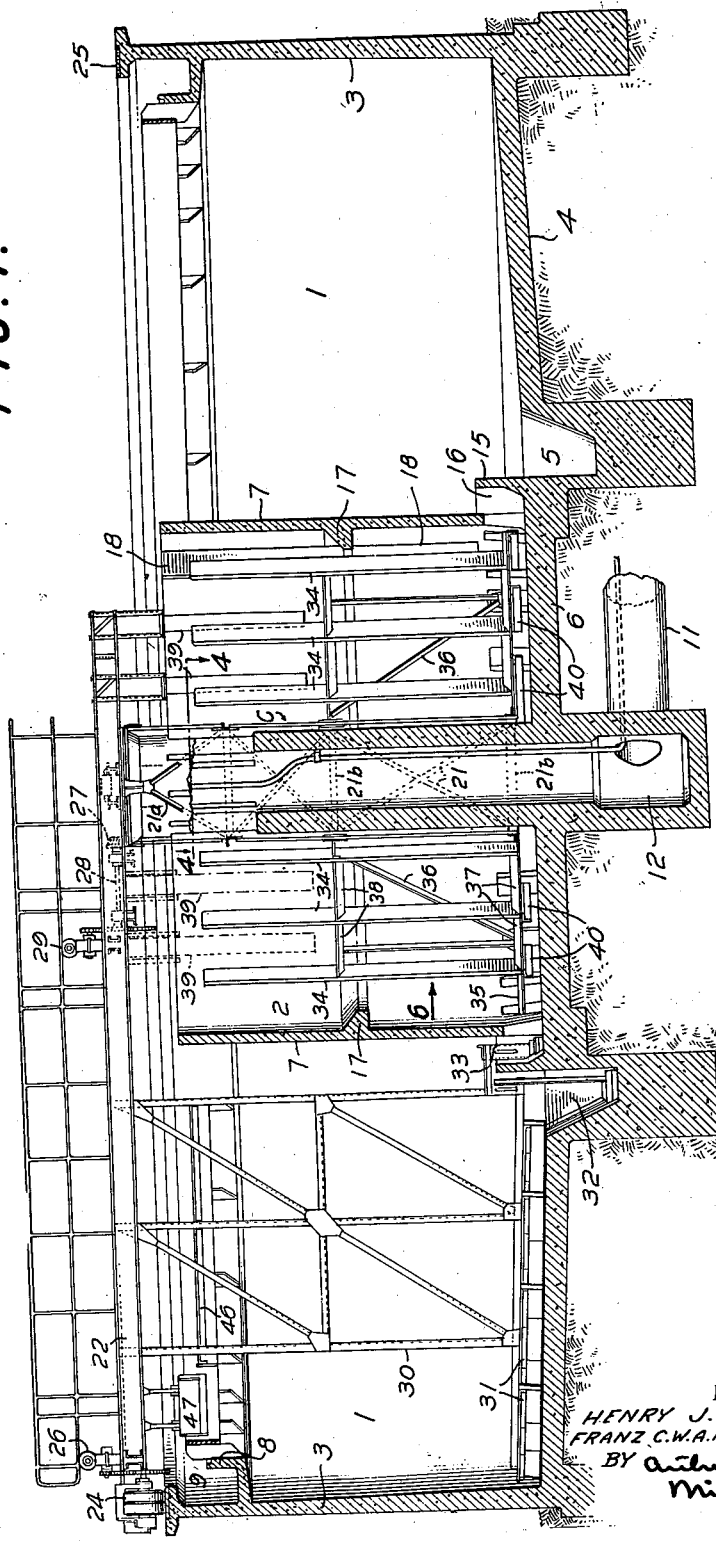
Figure 1 is a sectional elevation of a combined flocculation and sedimentation apparatus.
Figure 2:
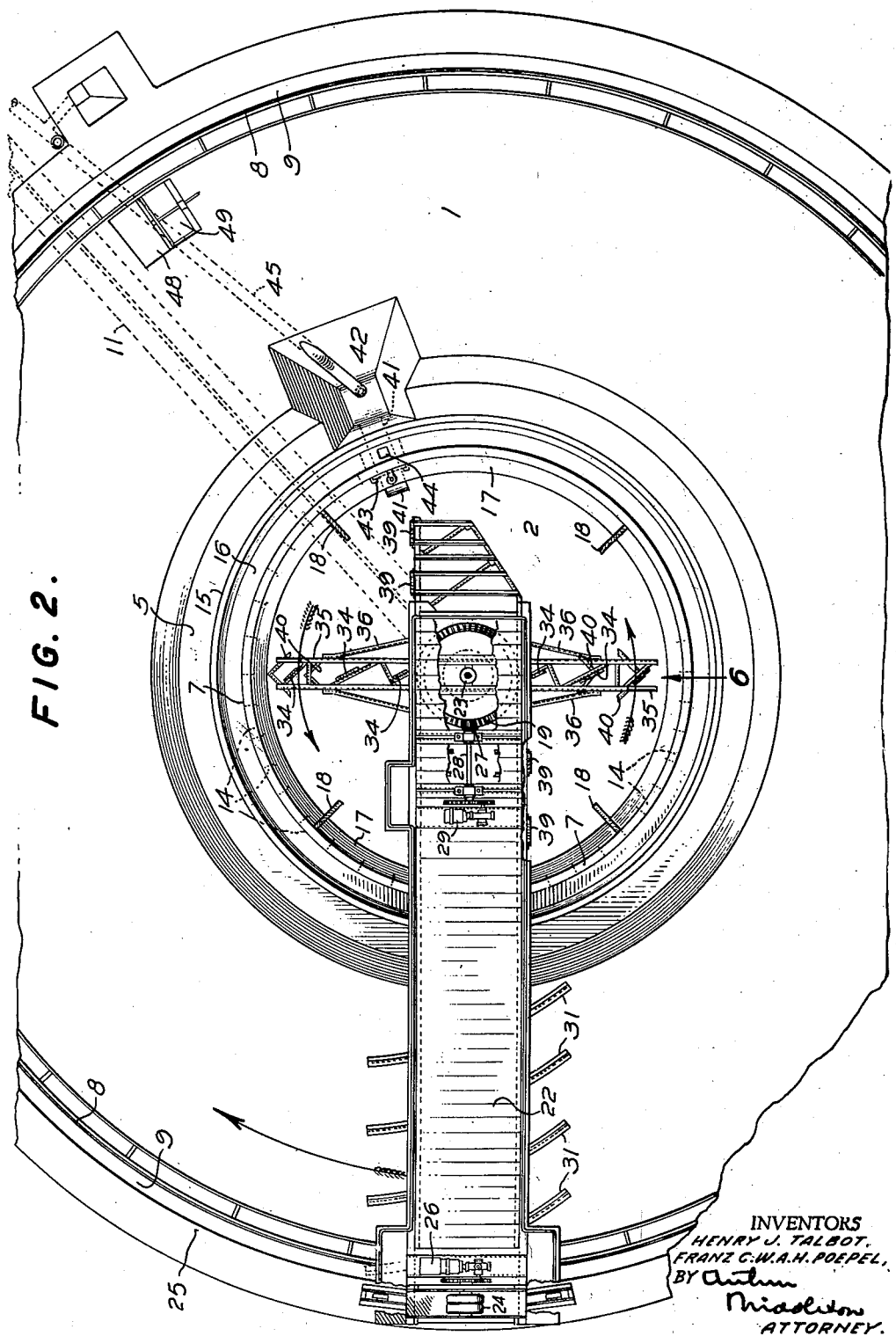
Figure 2 is a plan view of the apparatus, partially broken away.

Figure 4 is a horizontal sectional view through the lateral feed-discharge openings at the upper portion of the hollow upflow pier, to wit, Figure 4 is a horizontal sectional view taken as on the plane indicated by the horizontal line 4—4 of Fig. 1 looking downwardly in the direction of the arrows and in this connection it will be noted that a portion of this figure constitutes a view taken as on the horizontal line 4—4 of Figure 5 looking downwardly in the direction of the arrows;

Figure 5 is a detail view of the horizontally-turnable gear that is mounted on a stationary bearing member at the upper end of the hollow pier or center column and of the horizontally-turnable truss that spans the space below the center pier and the marginal wall of the sedimentation tank the inner end of which truss is supported on a turnable bearing member that is in turn supported by the turnable gear while the outer end is carried on traction wheels that travel along the marginal wall;

Figure 6 is a vertical view of the movable flocculating paddle structure, to wit, a view looking in the direction of the straight arrow of Figure 2, namely, the arrow which appears near the reference character 6.

In carrying the invention into effect according to one convenient mode, as applied by way of example to an apparatus for clarifying sewage, there is provided a circular tank structure affording two concentric sections or zones 1 and 2. The outer annular zone 1 constitutes the sedimentation zone and is defined by a circular outer wall 3. The bottom 4 of this zone preferably slopes inwardly towards an annular collecting channel or sediment-receiving sump 5. The inner zone 2 is circular with a preferably flat bottom 6, and from the periphery thereof rises a circular wall 7 which extends above the normal liquid level in the tank, and defines the flocculation zone or compartment which, it will be appreciated, is surrounded by the sedimentation compartment 1.

The liquid level in the tank is determined by the wall 8 of a trough or launder 9 which is arranged near the upper edge of the outer wall 3 of the tank structure and from which the overflowing supernatant liquid is withdrawn. A hollow column or pier 10 rises from the centre of the floor of the flocculation compartment 2 and serves as an inlet for the liquid to be treated and also as a support for certain parts of the mechanism as will be described hereafter. The inlet pipe 11 joins the vertical passage formed within the hollow column at a point below the floor 6 of the tank and an enlarged chamber 12 is provided at this point for the purpose of producing an even distribution of the incoming liquid over the cross section of the vertical passage. At the upper end of the column there is a suitable construction providing, at about the location of the normal level of the liquid in the tank, a series of lateral openings 13 through which the liquid supplied for treatment is delivered into the upper portion of the flocculation zone or compartment and the walls of which are inclined in such a way that a spiral outflow of the liquid into the tank is obtained.

At the lower end of the wall or partition 7 which defines the flocculation compartment is a series of openings 14 which communicates with the surrounding sedimentation compartment 1. These openings lie immediately adjacent the bottom of the flocculation compartment and are of such a size as to preclude the break-up or disintegration of flocs passing therethrough. Disposed outside these openings and spaced therefrom is a circular baffle wall 15 which forms with the partition wall 7 a trough-shaped structure 16 and is formed and adapted to direct the flocculated liquids passing through the openings 14 in an upward direction into the sedimentation compartment 1.

Figure 3:
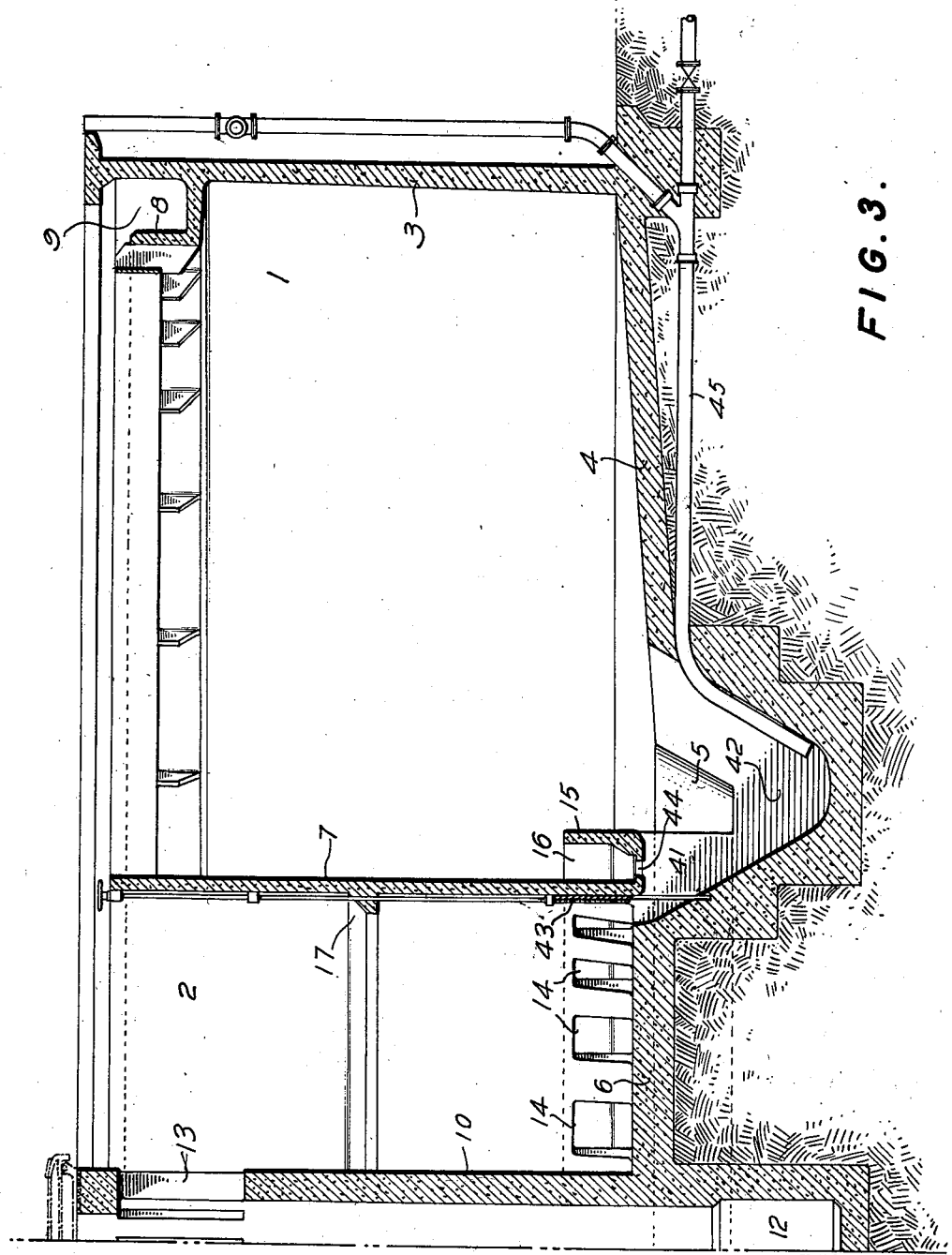
Figure 3 is a sectional elevation of one half of the tank structure taken through the sump.

On the inner side of the circular partition wall 7 there is provided a horizontal deflector 17, the upper surface of which is inclined downwardly towards the centre of the flocculation zone. This deflector is in the form of a horizontal shelf as shown in Figures 1 and 3 extending preferably completely round the wall 7 about halfway up the latter and is arranged so that liquid flowing downwardly along the face of the wall is deflected inwardly towards the centre of the compartment. Additional deflectors may be provided if desired.

A series of vertical baffles is also arranged around the wall of the flocculation compartment and the baffles comprise vertical plates or boards 18 extending radially inwards. These baffles in conjunction with the deflector or deflectors 17 previously referred to are adapted to assist in the formation of eddies, and thereby to prevent short circuiting of the liquid entering the flocculation compartment, i. e. to prevent such liquid from following the shortest path between the inlet openings 13 and the outlets 14.

Movable flocculating blades or paddles 34 are provided and are carried upon a frame structure or cage C which is rotatably supported upon the upper end of the central column 10. A stationary axial bearing 18' supports a horizontally-turnable bearing member in the form of a rotatable gear ring 19 from which is suspended the cage C comprising vertical members 20 and cross braces 21. The cage C also comprises sets of depending diverging members 21ª the upper ends of which are connected to the horizontally-turnable bearing member 19 and the lower ends thereof are connected to the lower portion of the cage structure, to wit, to that portion which comprises the vertical members 20 and the cross bracing 21. It will also be noted that the cage includes horizonal members such as 21ᵇ and suitable connecting plates whereby a relatively strong light and rigid structure is provided. A truss or bridge 22 is also rotatably supported upon the column by means of a horizontally-turnable bearing member 23' on a second stationary axial bearing 23 which is functionally independent of the bearing 18' carrying the gear ring 19. The outer end of the bridge 22 is provided with traction wheels 24 which run upon a circular track 25 at the periphery of the tank, and are driven by means of an electric motor 26 mounted upon the truss. The gear ring 19 meshes with a bevel pinion 27 on a shaft 28 carried by the truss and driven by an electric motor 29.

The truss 22 also carries a frame 30 upon which are mounted scraper blades or rakes 31 arranged to operate over the sloping bottom 4 of the sedimentation compartment and to displace the settled material thereon into the annular channel 5 which is arranged at the inner periphery of said compartment. The frame carries a scraper blade 32 that extends therefrom downwardly into the channel 5 and the frame 30 also carries a scraper blade 33 that extends downwardly therefrom and which is operating within the trough-shaped structure 16 immediately outside the openings communicating with the flocculation compartment.

The flocculating blades or paddles 34 comprise or are provided by a series of vertical plates or boards 34 supported upon radial arms 35 which are braced by inclined tie members 36. The cage also carries horizontal paddles or members which are disposed in two series one above the other. One series lies near the bottom of the compartment and consists of horizontal members or blades 37 inclined so as to displace the flocs upwardly. A second series comprises blades or members 38 that lie about halfway up the compartment, and that are inclined so as to displace the flocs downwardly. It will be understood that any desired number of series of horizontal paddle blades may be provided.

The truss 22 also carries a series of vertical paddle elements 39 which extend downwardly into the flocculation compartment and are adapted to co-operate with the flocculating blades 34 previously described.

The lower part of the flocculating blade structure carries scraper blades 40 arranged to displace solids which settle on the floor of the compartment towards the outer periphery thereof. An outlet 41 provided at a suitable point leads downwardly to a sump 42 lying below the bottom of the sedimentation compartment and communicating with the collecting channel 5. A valve or penstock 43 controls this outlet. The trough-shaped structure 16 formed by the baffle wall surrounding the submerged outlets for the flocculated liquids is also provided with a discharge opening 44 leading to the sump 42. The scraper 33 previously referred to as operating within the trough 16 keeps the same clear of settled solids and prevents the opening 44 from becoming clogged. By the provision of the opening 44 it is possible to discharge heavy settled solids such as sand from the flocculation compartment to the sump, and also to pass settled sludge from the sump into the flocculation compartment or into the trough 16 for assisting in the formation of flocs by the so-called blanket filtration effect. The transfer of solids or sludge from the sump for this purpose may be effected by maintaining a suitable sludge level in the sedimentation compartment and this is controlled by suitably regulating the rate of withdrawal from the sump through the pipe 45 provided for this purpose.

It will be understood from the construction so far described that the truss 22 carrying the scrapers 31 and the structure carrying the flocculating paddles 34 may be rotated at different speeds and are independently controllable by suitable control of the driving motors 26 and 29. Under normal operating conditions the direction of rotation of the flocculating blades 34 is opposite to that of the truss or bridge 22 which carries the scrapers in the main sedimentation compartment, and hence the scrapers 31 will move in the reverse direction to the paddle blades 34. These latter are arranged at an inclination to the substantially radial arms 35 upon which they are carried as will be seen from the drawings and are so disposed so as to displace the liquid towards the centre of the compartment. The inclined inlet openings 13 in the central column are disposed in such a way that liquid enters against the direction of movement of the said paddles.

In the operation of the apparatus the liquid to be treated is fed continuously into the upper part of the flocculation compartment through the inclined openings 13 in a more or less spiral path, and flows in a generally downward direction through the compartment where it is subjected to the gentle agitative action of the revolving paddles. As previously mentioned the vertical paddle blades 34 tend to displace or deflect the liquid towards the centre of the compartment and the deflected streams are dispersed, in the upper portion of the compartment, by the blades 39 moving in the opposite direction. The tendency of liquid to pass down the outer wall of the compartment is prevented by the deflecting shelf 17 as previously described.

When the liquid reaches the lower half of the sedimentation compartment it is subjected to the action of the horizontal paddles or members 37 and 38. The inclination of the paddles 37 is such as to deflect the flocs upwardly as the paddle structure rotates, while the paddles 38 deflect the flocs downwardly. By these means the heavier flocs which settle most quickly are raised and the descent of the lighter flocs is expedited, so that better mixing conditions are afforded and a higher rate of settlement is obtained.

The liquid containing the flocs which have been agglomerated by the large number of gentle collisions produced in the compartment 2 passes through the submerged openings 14 at the bottom of the compartment and is directed upwardly by the surrounding baffle wall 15 into the sedimentation compartment 1 in which the solids settle as sludge and the clarified liquid is withdrawn by the launder 9. The truss 22 is revolved at a slow speed and the settled solids are progressively displaced by the scrapers 31 towards the collecting channel 5 at the inner periphery of the compartment. The rotatable paddle structure in the flocculation compartment is simultaneously revolved in the opposite direction, and the scrapers 40 carried by this structure displace any solids settling on the bottom towards the outer periphery of the compartment where they are discharged into the sump 42 as previously described.

Either of the motors 26, 29 driving the truss and the paddle structure, respectively, may be stopped if desired and the other continued in operation. Moreover, the flocculation compartment may be employed for sedimentation only by locking the paddle structure to the truss so that the two mechanisms revolve in unison. Such locking can be readily attained by merely stopping the motor 10. The gear ratio between the rotor shaft of the motor 29 and the shaft 28 is such that shaft 28 would stand still and through the medium of the gear 27 on the shaft, said gear 27 which is thus prevented from rotating, will cause the gear ring 19 to turn about a vertical axis as the truss or bridge 22 turns about with the same axis. Another way of locking the paddle structure to the truss so that the two mechanisms will revolve in unison about the same vertical axis will be realized by lodging blocks, as for example, between the gear 27 and the gear 19 whereby they could not turn or move relative to each other. Such blocks could be placed between any other two gear members of the gear train between the motor on the one hand and the shaft 28 on the other hand whereby the thus blocked gears could not turn relative to each other. When this is done the paddle structure will be rotating in a direction opposite to that for which it is normally intended, and to permit the settled solids to be removed in these circumstances the scraper blades carried by this structure are of the double acting or so-called chevron type which are adapted to displace material outwardly when operating in either direction. These blades are shown in Figure 2. If desired the angle between the sides of the chevron blades and the arm to which they are attached may be made variable in order to compensate for the varying linear velocity of rotation at different points along the arm.

Where continuous operation of the flocculation compartment is desired these chevron blades are unnecessary and single blades may be provided.

If desired a travelling thickening device of the so-called picket fence type may be arranged to operate in the collecting channel of the sedimentation compartment, in place of the plain scraper 32.

For the removal of scum a suitable skimming blade 46 (see Fig. 1) may be mounted on the frame 30 which carries the sedimentation scrapers. An associated skimming blade 47 in the form of a hinged flap is supported from the truss 22 and is adapted to cooperate with a ramp 48 (see Fig. 2) leading to a raised scum discharge or scum box 49, in a manner which is well understood.

The specification of this patent is identical with that of application Serial No. 327,886, filed April 4, 1940.

Having now particularly described and ascertained the nature of our said invention and in what manner the same is to be performed, we declare that what we claim is:

1. Combined flocculation and sedimentation apparatus comprising a tank having a bottom, a marginal wall rising therefrom, and a partition wall that rises from the tank bottom dividing the tank into a flocculation zone and a sedimentation zone, openings through the lower portion of the partition wall affording communication leading from the flocculation zone to the sedimentation zone; influent means for delivering liquid to be treated into the flocculation zone; effluent release means leading from the sedimentation zone; means for agitating liquid in the flocculation zone for enhancing flocculation of the liquid therein; baffle means in the sedimentation zone located at the delivery side of openings and rising from the tank bottom to an elevation higher than that of the bottom of the flocculation zone for completing a pocket that assures retention of a blanket of sludge within the flocculation zone up to an elevation at least as high as that of the top of the baffle means; and means for passing sediment-discharge from the tank.

2. Combined flocculation and sedimentation apparatus comprising a tank having a bottom, a sump therefor for receiving sedimented material, a marginal wall rising from the bottom, and partition means dividing the tank into an inner flocculation compartment into which incoming material is received for agitative treatment therein and an outer relatively quiescent surrounding sedimentation compartment from which treated clarified supernatant liquid is released from the tank, said partition means having passageways leading from the lower interior portion of the flocculation compartment to the sedimentation compartment; sediment discharge means for the sump; means for agitating the liquid within the flocculation compartment; means for transferring sedimented material from diverse portions of the bottom of the sedimentation zone to the sump; scraper mechanism operable over that portion of the structure providing the bottom of the flocculation compartment; and means for moving said scraper mechanism in horizontal repetitive paths about a vertically-extending axis; said scraper mechanism embodying as an essential part thereof sediment-impelling bladed means disposed for progressively displacing sludge engaged thereby towards said pasageways.

3. Combined flocculation and sedimentation apparatus comprising a tank structure having a bottom, a marginal wall rising from the bottom, and an annular partitioning wall functionally dividing the interior of the tank into an inner flocculation compartment and a surrounding sedimentation compartment; said partitioning wall having passageways leading from the flocculation compartment and provided so that said compartments are in constant hydraulic communication whereby flocculated liquid can pass progressively from the flocculation compartment into the sedimentation compartment; means for delivering into the flocculation compartment liquid to be treated therein; means for releasing supernatant liquid from the sedimentation compartment; paddle means comprising vertically-extending bladed elements turnable about a vertical axis in the flocculation compartment; means for moving the turnable bladed elements; a column in said flocculation compartment from which at least some of the paddle means are suspended; a rotating truss pivotally supported upon said column; scraper means carried by said truss and operated over the floor of the sedimentation compartment for scraping sedimented material from diverse sections of the floor of said sedimentation compartment; means for passing scraped sedimented material from the lower interior portion of the sedimentation compartment to the exterior of the tank; means for rotating the truss; and bladed elements carried by the truss adapted to extend into the flocculation compartment for cooperating with the turnable bladed elements.

4. A sedimentation and flocculation unit comprising a tank structure providing a relatively quiescent sedimentation zone having a bottom portion for receiving sedimented material and an outer marginal wall rising therefrom, and a concentric inner agitated flocculation zone having an inlying bottom portion, an encompassing partition wall disposed over said inlying bottom portion dividing said zones from each other, flow passageways leading through said partition from the lower interior portion of the flocculation zone whereby said zones are in constant hydraulic communication with each other; influent liquid supply means for the flocculation zone; motor actuated paddles for the flocculation zone; an effluent liquid launder providing an overflow past which flows supernatant liquid from the sedimentation zone; a sediment-receiving sump in the bottom portion of the sedimentation zone; sediment-impelling means for transferring sedimented material from diverse sections of the bottom portion of the sedimentation zone to said sump; a sediment-discharge means for passing sedimented material from said sump to the exterior of the tank; and a baffle rising from the bottom portion of the sedimentation zone located between said sump and the partition wall and disposed in spaced relationship with respect to the latter; which baffle in conjunction with the partition wall provides a trough-shaped formation into which the flocculation liquid from the flocculation zone must pass prior to delivery into the sedimentation zone.

5. A unit according to claim 4, having scrapers connected so as to be movable with the motor actuated paddles for the flocculation zone and operatively disposed over the bottom portion of the flocculation zone for impelling settled solids towards the flow passageways.

6. A unit according to claim 4, having connected to the sediment impelling means a bladed scraper that operates along and within the trough, and a sediment discharge opening leading from the interior portion of the trough to the sump and provided for passing to the latter sediment transferred along the trough to the entrance end of said discharge opening by said scraper.

7. A unit according to claim 4, having a passageway leading directly from the interior of the flocculation zone to the sump and a positionable gate which when open permits the direct passage of sedimented material from the flocculation zone directly into said sump and which when closed prevents such direct transfer.

8. A unit according to claim 4, having certain of the paddles extending vertically; scraper blades located at the lower ends of the vertically extending paddles functioning incident to horizontal movement to convey solids outwardly towards the flow passageways; a passageway leading from the interior of the flocculation zone to the sediment-receiving sump; and a positionable gate for closing this passageway but movable from closing position to permit the passing of solids directly from the flocculation zone to the sump.

9. Apparatus according to claim 4, in which the sediment-receiving sump in the bottom portion of the sedimentation zone is in the form of a channel circular in plan; in which the trough-shaped formation provided by the baffle and partitioning wall is all circular in plan and in which there is a sands-discharge opening leading from the lower portion of said trough to said channel, and in which the mechanism for impelling sedimented material from diverse sections of the bottom portion of the sedimentation zone delivers it into said channel and has a scraper blade for the channel and another scraper blade for the trough.

10. A combined flocculation and sedimentation unit comprising a tank having a bottom and a marginal side, a substantially circular partition dividing the tank into an inner flocculation zone disposed over the central portion of said bottom and an outer quiescent sedimentation zone, and flow passages in the lower portion of said partition through which said zones are in constant hydraulic communication; influent liquid supply means for the inner zone, motor actuated flocculating blades for agitating liquid within the inner zone in a manner conducive to floc formation and development; an effluent liquid overflow weir that determines the liquid level within said zones and past which supernatant liquid flows from the sedimentation zone; a sediment-receiving channel disposed outwardly with respect to said partition; means for impelling sedimented material into said channel; means for removing sedimented material therefrom, and a substantially circular baffle extending upwardly from the tank bottom that surrounds and is spaced from the lower portion of the partition whereby to complete a trough formation into which flocculated liquid passing from the flow passages is transitorily received prior to its delivery into the sedimentation zone.

11. A combined flocculation and sedimentation unit comprising in combination, a sedimentation tank having a bottom with boundary walls; an annular partition wall rising from the bottom of the tank dividing the interior of the tank into an inner flocculation zone and a surrounding sedimentation zone, and a series of passageways at the lower portion of the annular partition wall and leading from the lower interior portion of the flocculation zone; influent liquid supply means for the flocculation zone; means for withdrawing supernatant liquid from the sedimentation zone that provides a weir determining the normal liquid level in said zones; motor actuated flocculating paddles for the flocculation zone; a substantially circular sediment-receiving channel disposed in that section of the tank bottom providing the floor portion of the sedimentation zone; sediment-transferring means for impelling sedimented material to said channel; means for removing sediment from said channel; a baffle wall rising from the tank bottom into the sedimentation zone, inwardly disposed with respect to said circular sediment-receiving channel, and disposed outwardly with respect to the partition so as to provide with the partition a trough into which liquid from said openings is transitorily received preceding its delivery to the sedimentation section; and means providing a valve controlled sands discharge passageway leading from the lower interior portion of the flocculation zone to the circular sediment-receiving channel.

12. A combined flocculation and sedimentation unit comprising in combination a sedimentation tank having a bottom with a marginal wall extending upwardly therefrom and partition means dividing the interior of the tank into an inner agitated flocculation zone and a surrounding relatively quiescent sedimentation zone, a flow passage area leading from the lower interior portion of the flocculation zone and affording constant hydraulic communication between said zones; a sediment-receiving channel inwardly spaced from the base of the marginal wall; means for removing sedimented material from said channel; influent supply means for delivering liquid into the flocculation zone; an effluent launder for withdrawing supernatant liquid from the upper portion of the liquid within the sedimentation zone and providing a weir overflow that determines the normal surface level of the liquid in said zones; a pier rising from the bottom of the tank and extending upwardly within the flocculation zone; a stationary axial bearing member on said pier; a turnable bearing member deriving support from said stationary member; a cage depending from said turnable bearing member; arms extending from said cage; spaced flocculating paddles rising from said arms for agitating liquid in the flocculation zone; raking elements deriving support from said arms for impelling settled solids to said channel; a second bearing element in the form of a second axial member deriving support from said pier; a turnable truss member mounted on said second axial member and extending so that the outer end thereof derives support from the boundary wall of the tank; a depending structure carried from said truss; sediment-transferring means operatively positioned at the lower portion of said depending structure and disposed for impelling solids over the bottom portion of the sedimentation zone to the sediment-receiving channel; spaced bladed members disposed for functioning within the flocculation zone in co-action with said paddles and supported from an overlying section of the truss; means for turning the cage and members supported therefrom in repetitive paths about said pier; and means for turning the truss in horizontally guided paths about said second axial member.

13. A unit according to claim 12, in which the means for turning the cage and the means for turning the truss can be simultaneously operated whereby when the cage moves in one direction the truss moves in the opposite direction.

14. A unit according to claim 10, having an annular baffle member in the sedimentation zone on the delivery side of said flow passages provided about the lower portion of the flocculation zone to divert the outward flow of flocculated liquid in transit from the flocculation zone to the sedimentation zone; and a sands transferring passageway leading from the lower interior portion of the flocculation zone to the sediment-receiving channel.

15. A combined flocculation and sedimentation unit comprising in combination a sedimentation tank having a bottom with boundary walls extending upwardly therefrom, partitioning means dividing the tank into an inner flocculation zone and a surrounding relatively quiescent sedimentation zone, a flow passage area affording constant hydraulic communication between said zones; a sediment-receiving sump for the tank bottom; means for discharging sedimented material from said sump; influent liquid supply means for the flocculation zone; an effluent discharge launder for the sedimentation zone; a supporting pier rising from the bottom of the tank extending for the flocculation zone; a stationary bearing member mounted on said pier; a turnable bearing member deriving support from said stationary bearing member; a cage surrounding said pier and depending from said turnable bearing member; arms extending outwardly from the lower end portion of said cage; vertically extending flocculating paddles rising from said arms; a second bearing element in the form of an axial member which derives support from said pier; a horizontally turnable truss member mounted on said last mentioned bearing element as an axial member therefor and extending so that the outer end thereof derives support from the boundary wall of the tank; vertically extending bladed members functioning in co-action with said flocculated paddles and supported from an overlying section of the truss; means for turning the cage and members supported therefrom in repetitive paths; and means for turning the truss in horizontally guided paths about the axial member therefor.

16. A combined flocculation and sedimentation apparatus comprising a tank having a bottom with a sump for receiving sedimented material passed thereto, a marginal wall rising from said bottom for completing the liquid-holding section of the tank, and partial partitioning means dividing the tank into horizontally-disposed functionally-separated flocculation and sedimentation compartments but having passage area leading from the lower interior portion of the flocculation compartment into the sedimentation compartment, the latter of which compartments overlies that portion of the tank bottom with said sump and has an effluent launder with an overflow edge that determines the normal surface level of the liquid in said compartments; influent means for delivering incoming material into the flocculation compartment; means comprising paddles for agitating the liquid within the flocculation compartment; means for actuating said paddles; means for transferring sedimented material from diverse portions of the bottom of the sedimentation zone to said sump; and means for passing transferred sedimented material from said sump; said apparatus being characterized in that it includes a baffle member rising from the bottom of the tank and disposed between said partial partition on the one hand and said sump on the other and which completes a trough having an upper edge at elevation higher than that of the bottom of the flocculation zone thereby affording means for maintaining a blanket of sludge within the lower portion of the flocculation zone up to an elevation at least as high as that of said upper edge of the trough.

17. A combined flocculation and sedimentation apparatus according to claim 16, in which there is means for scraping sedimented material from diverse sections of the bottom of the flocculation compartment towards and into the passage area at the lower portion of the partial partition, in which there is a downwardly extending sediment passageway leading from said trough to said sump, and in which there is scraping means operable within the trough for effecting a passing of sedimented material along said trough to said downwardly directed passageway.

HENRY JOHN TALBOT.
FRANZ CARL WILHELM
ANTON HENRI PÖPEL.